United States Patent
Lipsky

(10) Patent No.: US 11,758,374 B2
(45) Date of Patent: Sep. 12, 2023

(54) TRAVELER'S SCALE

(71) Applicant: FEP HOLDING COMPANY, LLC, Princeton Junction, NJ (US)

(72) Inventor: Barry J. Lipsky, Princeton Junction, NJ (US)

( * ) Notice: Subject to any disclaimer, the term of this patent is extended or adjusted under 35 U.S.C. 154(b) by 484 days.

(21) Appl. No.: 17/142,514

(22) Filed: Jan. 6, 2021

(65) Prior Publication Data

US 2021/0211849 A1 Jul. 8, 2021

Related U.S. Application Data

(60) Provisional application No. 62/957,612, filed on Jan. 6, 2020.

(51) Int. Cl.
  *H04W 4/38* (2018.01)
  *G09G 5/00* (2006.01)
  *G01G 19/44* (2006.01)
  *G01G 3/14* (2006.01)
  *H04W 4/80* (2018.01)

(52) U.S. Cl.
  CPC ............... *H04W 4/38* (2018.02); *G01G 3/14* (2013.01); *G01G 19/44* (2013.01); *G09G 5/003* (2013.01); *G09G 2330/00* (2013.01); *G09G 2370/025* (2013.01); *G09G 2370/16* (2013.01); *H04W 4/80* (2018.02)

(58) Field of Classification Search
  CPC . H04W 4/38; H04W 4/80; G01G 3/14; G01G 19/44; G09G 5/003; G09G 2330/00; G09G 2370/025; G09G 2370/16
  See application file for complete search history.

(56) References Cited

U.S. PATENT DOCUMENTS

| | | |
|---|---|---|
| 4,711,313 A | 12/1987 | Ida et al. |
| 4,765,421 A | 8/1988 | Newton et al. |
| 5,994,649 A | 11/1999 | Garfinkle et al. |
| 2002/0009895 A1* | 7/2002 | Wong et al. ............ A63B 22/02 482/54 |
| 2004/0163855 A1 | 8/2004 | Carlucci |
| 2004/0229575 A1* | 11/2004 | Chan ..................... G01G 19/44 455/90.3 |
| 2008/0014696 A1* | 6/2008 | Okura et al. ........... A61B 5/107 600/547 |
| 2016/0374618 A1 | 12/2016 | Giovangrandi |
| 2019/0331521 A1* | 10/2019 | Xu ..................... G01G 23/3721 |

OTHER PUBLICATIONS https://physics.stackexchange.com/questions/138371/weighing-with-one-foot-scale.
https://www.amazon.com/gp/product/B07W22GPZ2/ref=ppx_yo_dt_b_asin_title_006_s00?ie=UTF8&psc=1.
https://www.amazon.com/gp/product/B004V8EBOl/ref=ppx_yo_dt_b_asin_title_008_s00?ie=UTF8&psc=1.
Fitbit aria Wi-Fi Smart Scale Product Manual (USA), Aria Product Manual Rev C 114-0019, pp. 1-14.
International Search Report from International Patent Application PCT/US2021/12314 dated Mar. 23, 2021.

* cited by examiner

*Primary Examiner* — Abbas I Abdulselam
(74) *Attorney, Agent, or Firm* — Gregory J. Winsky, Esq.; Archer & Greiner, P.C.

(57) ABSTRACT

A compact and lightweight electronic traveler's scale for determining and tracking a person's weight while away from home.

9 Claims, 3 Drawing Sheets

TRAVELER'S SCALE

CROSS REFERENCE TO RELATED APPLICATION

This application claims the benefit of U.S. Provisional Applications No. 62/957,612 filed on Jan. 6, 2020.

FIELD OF THE INVENTION

The field of the instant invention is scales for determining the weight of persons.

BACKGROUND OF THE INVENTION

Many people desire to weigh themselves and track their weight daily, such as fitness enthusiasts, dieters, and others for medical reasons. Users typically also desire to weigh themselves daily at the same time each day to have a base line of comparison. A recent study presented at the American Heart Association's Scientific Sessions conference concluded that daily weigh-ins might be beneficial to those with heart problems or susceptible to heart problems. Researchers tracked 1,042 adults over a year and found that people who weighed themselves once a week or fewer times did not lose weight, while people who weighed themselves six or seven times a week averaged a 1.7 percent weight loss.

SUMMARY OF THE INVENTION

At the present time, there is a very limited choice of scale offerings for travelers. Some of the issues with the offerings are that the scales have too small of a footprint for the weighing person to be sure footed or that the offerings have inconsistent footing for varying foot sizes that makes it difficult for a user to maintain balance when their feet are so close together. These traveler's scales also provide inconsistent results vis a vis the user's home scale. The current crop of products lack a useful and reliable ON/OFF control to prevent automatically cycling ON/OFF while packed in a suitcase which drains the battery. The current prior art products are as a general matter are just too heavy and/or too big for efficiency in traveling situations. Some examples of the prior art are the Fiteza Voyascale Step on Mini Weight Scale and the NewlineNY 700 Series Travel/Mini Digital Scale. The prior art offerings are generally too small in footprint so that one can lose one's balance when trying to find weight, or conversely too big and heavy for convenient travel, show weight only in pounds, and may have limited accuracy and consistency in weight determination.

An alternative to a traveler's scale can be seen as using a common scale provided in many hotel exercise rooms; however, such scales are not available at all hotels, if available, may vary in each hotel so as to give inconsistent measured weights, prove difficult to weigh oneself at the same time each day, and also are not connected to any personal electronics or accessible by software applications.

The instant invention solves the problems of the prior art scales by providing a light weight system using two electronically connected platforms on which the person weighing himself or herself can stand comfortably and safely that can be easily carried in travel and connected to other electronics for tracking weight while traveling.

DETAILED DESCRIPTION OF THE INVENTION

Figure 1:
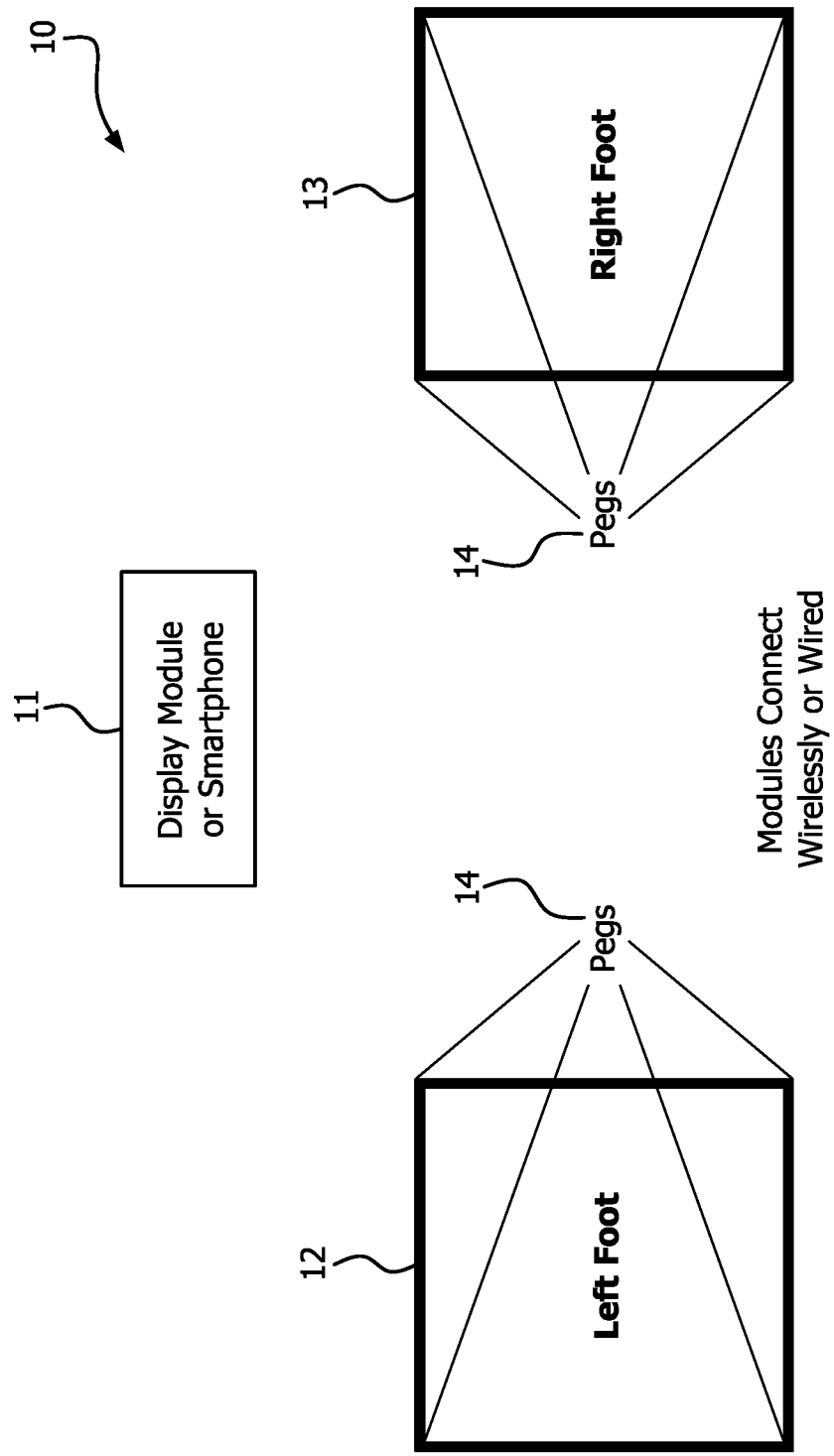
FIG. 1 is a representation of the main components of the system of the present invention.
Figure 2:
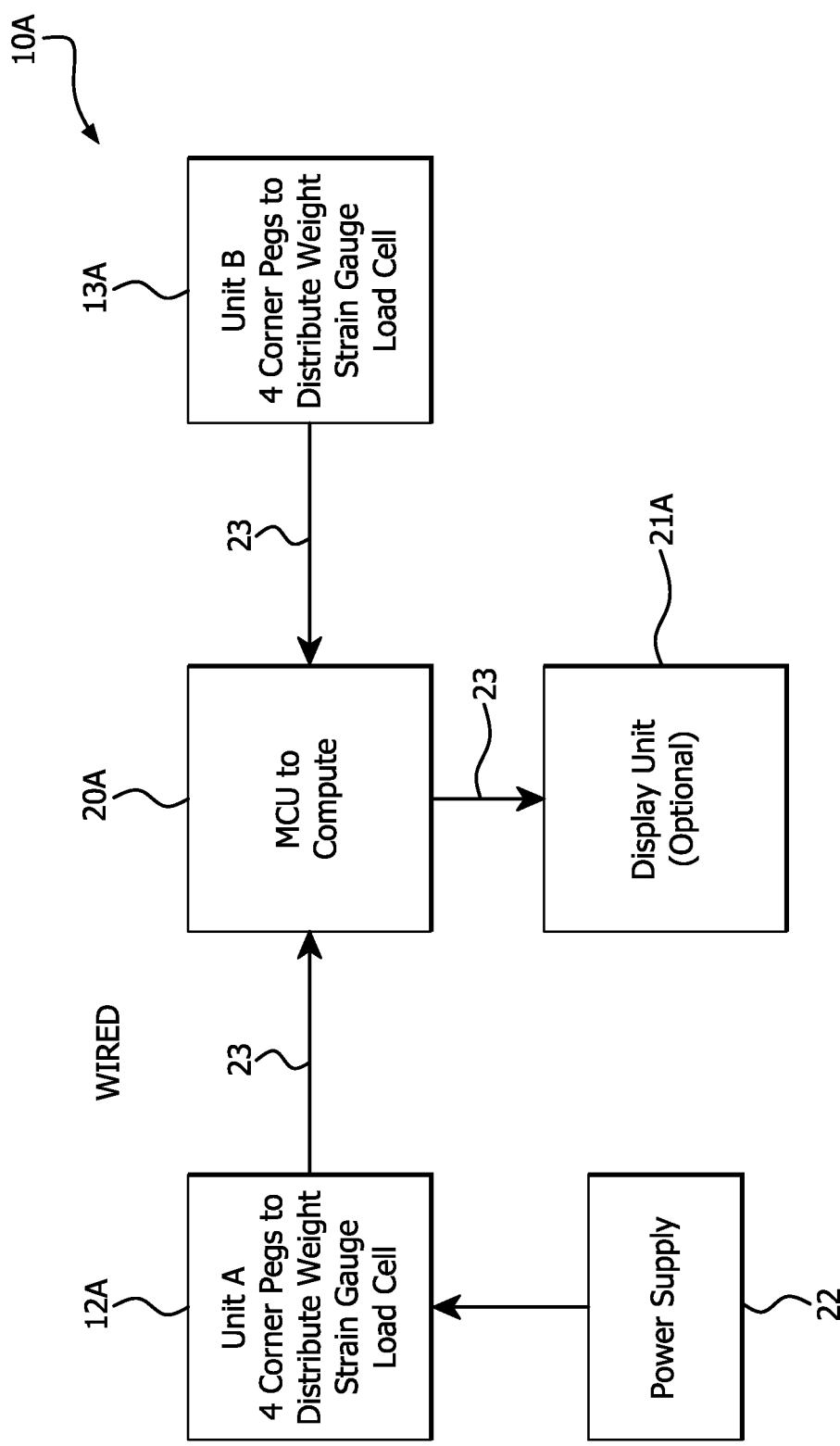
FIG. 2 is a block diagram showing the main components of one embodiment of the present invention.
Figure 3:
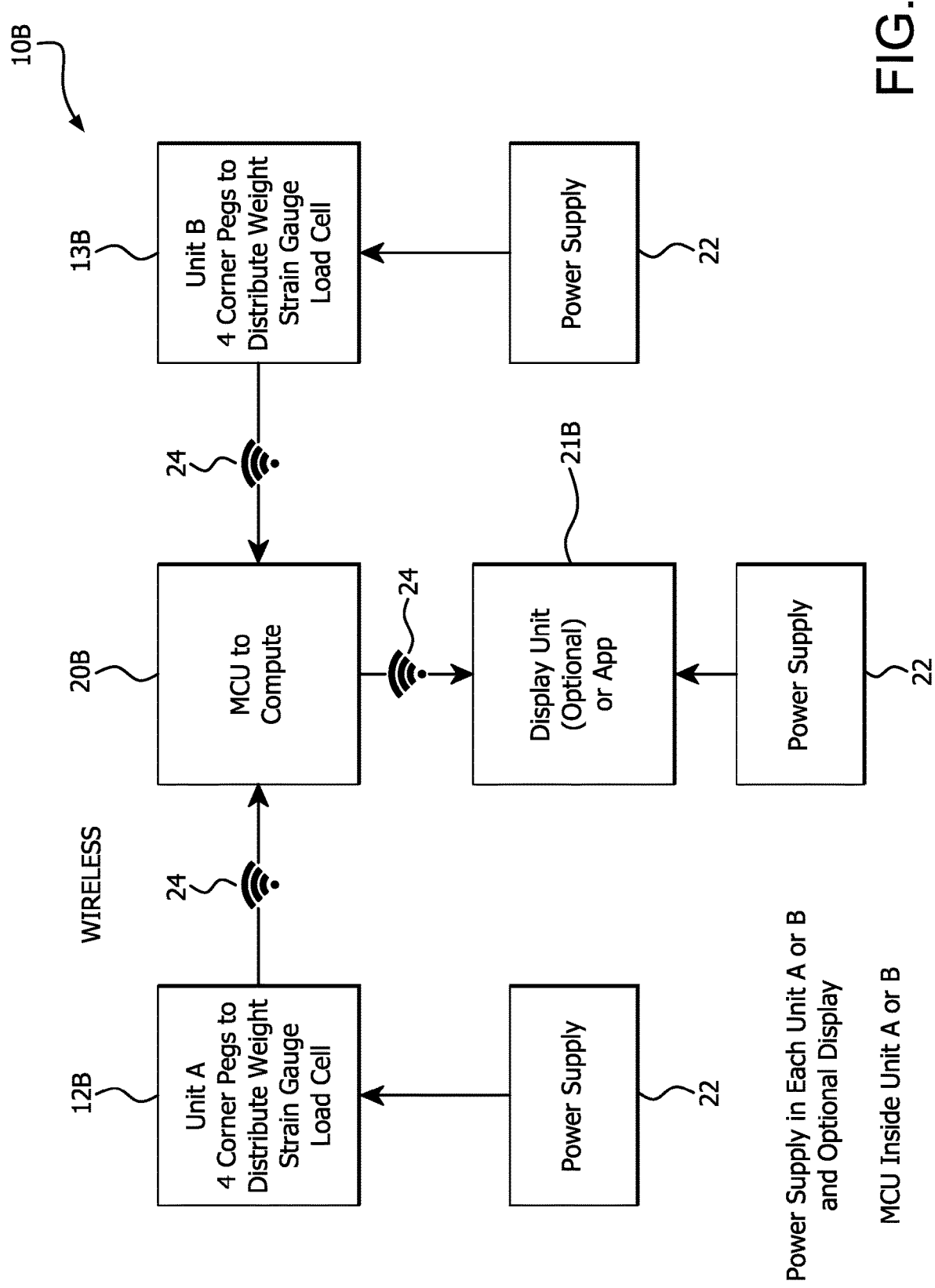
FIG. 3 is a block diagram showing the main components of a second embodiment of the present invention.

Referring to the drawings, the system of the present invention for a traveler's scale 10 as shown in FIG. 1 includes an electronic display module 11 so that the person being weighed can view the weight; in another embodiment, a separate electronic display module 11 can be replaced by a smartphone that also allows the weight to be accessed by the person being weighed. System 10 as shown in FIG. 1 also includes two platforms, platform 12 on which the left foot of the person to be weighed is placed, and platform 13, on which the right foot of said person is placed. As indicted on FIG. 1, said platforms 12 and 13 and said module (or smartphone) 11 can be connected wirelessly, such as by Bluetooth® connection or any other wireless connection (as shown in the embodiment of FIG. 2B) or can be connected by physical electrical connectors (as shown in the embodiment of FIG. 2A). Each platform, 12 and 13, has four pegs 14 (which are strain gauge load cells that are known in the art) that are used to generate electrical signals as the platforms are depressed by the person being weighed in the manner known in the art.

FIGS. 2A and 2B illustrate two different embodiments of system 10, labelled respectively 10A and 10B, The wired system 10A of FIG. 2A comprises two platform units, 12A for the left foot, and 13A for the right foot, each of which having four corner pegs to distribute weight that consist of a strain gauge load cell, all of which in turn create electrical signals through physical wiring 23 to microcontroller 20A (that can be housed in either platform unit 12A or 13A) having an output that drives the display of unit 21A. All of the electronic components of system 10A are powered by electrical power supply 22, that can be, among other things, a rechargeable battery or a flashlight battery.

The wireless system 10B of FIG. 2B similarly comprises two platform units, 12B for the left foot, and 13B for the right foot, each of which having four corner pegs to distribute weight, a strain gauge, and a load cell, all of which in turn create electrical signals that are wirelessly 24 connected microcontroller 20B (that can be housed in either platform unit 12B or 13B) having an output that drives the display of unit 21B wirelessly 24 connected as well. All of the electronic components of system 10B are powered by electrical power supply 22, that can be, among other things, a rechargeable battery or a flashlight battery.

Different embodiments of the traveler's scale of the present invention can be constructed using various options (but all must be small and light weight), such as the following: (a) Separate right and left foot components and while small allowing user to spread feet to comfortable balance and accommodate all foot sizes; (b) Right and left sensors connected to each other wirelessly, (or through wires) software to calculate weight; (c) the electronic circuitry controlled by the microcontroller 20A or 20B can be compatible with a variety of applications programs, or apps, running on a smartphone, a tablet, a laptop, a smartwatch, or any other electronic device; (d) optional wireless (or wired) display; (e) powers totally off for packing in a suitcase; (f) platforms can be designed as shown in FIG. 1 or can be designed as a "slipper like" platform for each foot; and (g) the platforms can be designed to be rollable, foldable, inflatable, or in a telescoping expandable design for packing in a small space as well as accommodating a broad range of foot sizes.

As can be understood, the preceding specification and description are not limiting and shall be construed to include other embodiments and elements similar to those specified herein.

What is claimed is:

1. A portable personal weighing system comprising:
    two electromechanical platforms, each having an electrical power input and an electrical signal output;
    at least one power supply connected to the electrical power inputs of each of said electromechanical platforms;
    an electronic display module having an electrical power input connected to said power supply and having an electrical signal input; and
    at least one microcontroller controlled electronic circuit having an electrical power input connected to said power supply, having electrical signal inputs connected to each of said electrical signal outputs of each of said platforms, and having an electrical signal output connected to the electrical signal input of said display wherein each of said electromechanical platforms are comprised of a planar structure having four strain gauge load cells, each one of which being located at each corner of said planar structure, that provide said electrical signal output of said platform.

2. A portable personal weighing system comprising:
    two electromechanical platforms, each having an electrical power input and an electrical signal output;
    at least one power supply connected to the electrical power inputs of each of said electromechanical platform;
    a wireless portable computing device; and
    at least one microcontroller controlled electronic circuit having an electrical power input connected to said power supply, having electrical signal inputs connected to each of said electrical signal outputs of each of said platforms, and having an electrical signal output wherein each of said electromechanical platforms are comprised of a planar structure having four strain gauge load cells, each one of which being located at each corner of said planar structure, that provide said electrical signal output of said platform.

3. The system of claim 2 in which said portable computing device is selected from the group comprising smartphones, tablets, laptops, Chromebooks, smartwatches, wearable computing devices, and other smart devices.

4. The system of claim 3 in which said portable computing device has at least one resident application program providing for communicating visually and audibly data relating to weights measured using said system and for storing for review said data.

5. The system of claim 2 in which said portable computing device has at least one resident application program providing for communicating visually and audibly data relating to weights measured using said system and for storing for review said data.

6. A portable personal weighing system comprising:
    two electromechanical platforms, each having an electrical power input, an electrical signal output, and wireless capability;
    at least one power supply connected to the electrical power inputs of each of said electromechanical platforms; and
    a wireless portable computing device wirelessly connected to each of said electrical signal outputs of each of said platforms and having a resident application program controlling the processing of said electrical signals and providing for communicating visually and audibly data relating to weights measured using said system and for storing for review said data.

7. The system of claim 6 in which each of said wireless electromechanical platforms are comprised of a planar structure having four strain gauge load cells, each one of which being located at each corner of said planar structure, that provide said wireless electrical signal output of said platform.

8. The system of claim 6 in which said wireless connections are selected from a group comprising a WiFi™ connection and a Bluetooth® connection.

9. The system of claim 6 in which said portable computing device is selected from the group comprising smartphones, tablets, laptops, Chromebooks, smartwatches, wearable computing devices, and other smart devices.

* * * * *